(12) United States Patent
Thompson

(10) Patent No.: US 11,752,374 B1
(45) Date of Patent: Sep. 12, 2023

(54) PORTABLE FIRESAFE/LIGHTNING SAFE CONCERTINA WIRE

(71) Applicant: John Rasmus Thompson, Waianae, HI (US)

(72) Inventor: John Rasmus Thompson, Waianae, HI (US)

( * ) Notice: Subject to any disclaimer, the term of this patent is extended or adjusted under 35 U.S.C. 154(b) by 0 days.

(21) Appl. No.: 17/370,633

(22) Filed: Jul. 8, 2021

(51) Int. Cl.
H02G 13/00 (2006.01)
A62C 3/02 (2006.01)

(52) U.S. Cl.
CPC ............ *A62C 3/0257* (2013.01); *H02G 13/80* (2013.01)

(58) Field of Classification Search
CPC .......... H02G 7/14; H02G 13/80; H02G 13/00; A62C 3/0257; A62C 3/00; E01F 13/00; E01F 13/02; E01F 13/022; E01F 13/04
USPC ... 174/2, 1, 5 R, 5 SB, 5 SG, 68.1, 68.3, 78, 174/137 R, 138 R, 135
See application file for complete search history.

(56) References Cited

U.S. PATENT DOCUMENTS

| | | | | |
|---|---|---|---|---|
| 3,155,374 A | * | 11/1964 | Sieffert | F41H 11/08 256/33 |
| 3,825,671 A | * | 7/1974 | Pokorny | H02G 7/14 174/DIG. 12 |
| 4,503,423 A | * | 3/1985 | Mainiero | F41H 11/08 340/552 |
| 4,915,359 A | * | 4/1990 | Cochrane | G08B 13/122 256/10 |
| 7,652,090 B2 | * | 1/2010 | Alexander | C09K 21/14 524/588 |
| 7,661,656 B1 | * | 2/2010 | Gibbs | B21F 25/00 256/6 |
| 7,883,074 B2 | * | 2/2011 | Pavlov | B21F 25/00 256/2 |

FOREIGN PATENT DOCUMENTS

| | | | | |
|---|---|---|---|---|
| CN | 208604511 U | * | 3/2019 | ............. E01F 13/00 |
| CN | 209729104 U | * | 12/2019 | |

* cited by examiner

Primary Examiner — Angel R Estrada

(57) ABSTRACT

An improved concertina wire that is portable and lightweight, easy to handle, and protects against wildfires by absorbing heat and dissipating it through the abundant air gaps in the concertina wire. Made of aluminum, this wire is much lighter and a better heat conductor than previous concertina wire made of steel. Made without razors, this wire can be extruded or stamped into a spiral cylinder using standard tool and die methods. Made with lightweight, non-rusting aluminum, and without razors, this wire can be quickly deployed by most everyone without a machine in front of homes, vehicles, grasslands, forests and such. As coiled concertina wire, a person or animal can crawl into the center of the coils so that wildfires will be harmlessly absorbed by the wire and dissipated into the large air gap between the wires. Formed into a dome around a person, the wire forms a smooth Faraday Gage to dissipate lightning strikes. A smaller embodiment can be wrapped in mesh and permanently installed in a building soffit or frieze board to safely vent an attic and prevent flames and embers from entering.

10 Claims, 5 Drawing Sheets

PORTABLE FIRESAFE/LIGHTNING SAFE CONCERTINA WIRE

CROSS-REFERENCE TO RELATED APPLICATIONS

This application claims the benefit of provisional patent application Ser. No. 63/049,570 filed 2020 Jul. 8 by the present inventor.

FEDERALLY SPONSORED RESEARCH: N/A

SEQUENCE LISTING: N/A

BACKGROUND—FIELD

This relates to spiral-wound wire in the shape of a flexible cylinder that is light-weight, portable, and flexible that allow users to carry and set up quickly as a fire-safe perimeter and/or protection from lightning. This invention can also be permanent and semi-permanent to make a fire-safe home, building or landscape.

BACKGROUND—PRIOR ART

Metal-mesh has been used in safety lamps at underground coal mines for centuries. The mesh dissipates the heat of a flame in the lamp below the flash point of methane. For this application, flash point will refer to the lowest temperature for a liquid, gas or solid to be ignited in air.

In chemistry labs, the asbestos shield over a Bunsen Burner (gas flame) has been changed to a mesh screen. Because of the dangers of inhaling asbestos, a mesh screen is now used to absorb and dissipate the flame evenly along the bottom of a glass beaker above the screen.

The inventor has observed aerial views of grass fires on TV that show a flame stopping at chain-link fences. The metal in the fence absorbs the heat of the grass fire to below the flash point of grass on the other side of the fence. The chain-link fence is just mesh with wide holes. Chain-link fences have been used for security at many places, but not to prevent fire damage.

A mesh screen could be used with and without the spiral wire to absorb and dissipate flames. The mesh screen would absorb and dissipate heat in the multiple mesh spaces. A multi-layer cylinder, with an outer large air-gap spiral, and a smaller air-gap mesh inside would form protection from intense fires.

Small, steel, portable mesh-fences have been used for dog and pet exercise/playpens in parks, but they are rigid and heavy and made to be carried in a vehicle. Temporary large, steel mesh-fences have been used for crowd control and security, but they are rigid and very heavy.

Reflecting material has been used for years on rigid boards and on foil to reflect heat and cold. Metal foil has been used for years to reflect heat from sunlight on windows. Aluminized Mylar™ foil has been used on foldable cardboard and plastic shields to reflect heat from sunlight through car windows. Foils have been used in many insistences instances to reflect heat, but this portable wire is like a mesh that absorbs and dissipates heat to prevent the spread of fire.

According to the standard fire triangle or combustion triangle, oxygen, heat, and fuel are needed to create a fire. Oxygen and fuel are difficult to remove from a large area, but heat can be removed either by reflecting away by portable foils or absorbing with metal. This invention uses metal wire to absorb heat from the outside of the spiral cylinder and dissipate the heat through air gaps throughout the cylinder, thereby preventing a fire from crossing the cylinder. Said wire can also be non-moveable or permanent, such as near a home or building. Before thermal glass was used in front of fireplaces, metal wire-mesh was used to absorb and dissipate heat to the room and prevent the fire in the fireplace from spreading into the room.

In 2014, the U.S. Forest Service (USFS) conducted a fire shelter project. A survey from 3,803 firefighters showed that they wanted lighter weight and less bulk. Twelve companies supplied 50 samples to be tested. The following is quoted from the USFS website: "The fire shelter provides protection primarily by reflecting radiant heat and trapping breathable air inside. The shelter is comprised of two layers. The outer layer is woven silica laminated to aluminum foil. The foil reflects radiant heat and the silica cloth slows the transfer of heat to the inside of the shelter. An inner layer is fiberglass laminated to aluminum foil. The inner layer of foil prevents heat from being reradiated inside the shelter, and it prevents gases from entering the shelter. When the two layers of materials are sewn together, the air gap between them provides additional insulation."

It seems that the prior art is mainly interested in radiating heat with foil, not absorbing it with metal and dissipating the heat into air gaps as in the present invention. A metal wire to absorb heat, a cylinder air gap and spiral wire gap to dissipate the heat will provide heat protection for someone who crawled inside the spiral cylinder.

Concertina wire or razor wire has been used for decades to prevent entry into military bases and to prevent escape from prisons. The coiled wire can be set up quickly by manual or mechanical means. It has not been previously used to stop wildfires.

The present invention uses concertina wire to absorb flames to below the flashpoint of flora or material on the opposite side. If a flame approaches from one side, the concertina wire will absorb the heat and the large air gaps between the wire will dissipate the heat rapidly below the flashpoint of most anything on the other side.

Water has been used to put out wildfires, but it is heavy, evaporates quickly and is rare many places. Using helicopters and planes to drop water is inaccurate and risky to the pilots. Some water evaporates before it hits the ground, but metal continues to be used as a heat sink indefinitely. Helicopters could be used to drop coils of concertina wire in front of a fire or in front of important structures to slow or stop a wildfire. The coils could follow the topography on hills or in valleys. If a wildfire is coming up a hill, coils of concertina wire could be dropped and roll down the hill into the fire thereby slowing or stopping the fire.

The inventor played with a wire Slinky™ as a kid. If both ends of the Slinky are placed on the ground, it forms a closed cylinder with a dome shape inside the cylinder. If the Slinky were large enough, a person could crawl into the cylinder.

Normal concertina wire is difficult to work with because of the razor-sharp metal additions along the wire. It is also made of steel and is heavy. This invention uses concertina wire to prevent the spread of wildfires. It also improves on standard concertina wire by using aluminum instead of steel. Aluminum is much lighter and absorbs heat much better than steel. This invention does away with the razor blades and adds an X-shape or star-shape in cross-section to the round wire, to better absorb and dissipate heat. Firefighters can carry a roll of this new concertina wire and can spread it out quickly and crawl into the center for protection from the wildfire. The spiral cylinder could be spread out as a tube on the floor of a burning building so someone could crawl through the tube to safety without being burned.

U.S. Pat. No. 8,197,173 to Pessach et al. shows a rapid deployment machine for deploying several layers of concertina wire. For wildfires, probably only one roll would be needed, plus if the wire is aluminum and without razors, no machine would be needed to deploy the wire. The present invention can be deployed where there is no road, can contour over hills and valleys, and the invention can be deployed and gathered quickly without using special tools. Without razors, the present invention can be made quicker and cheaper than razor wire and would not harm farm animals or wildlife.

U.S. Pat. No. 5,699,818 to Carpenter Jr. shows an umbrella made from very flexible metallic cloth that pops out of a backpack. Carpenter goes on to say that the cloth must be smooth and not have any sharp points, as a smooth surface decreases the chance of a lightning strike. An umbrella only covers part of a person and is not grounded to the ground. The present invention can completely cover one or more persons in the prone position without any sharp points. Since the invention can form a cylindrical dome, it completely covers the person with a hollow conductor that is grounded to the ground. This forms a Faraday Cage so that no voltage can come into the invention from a lightning strike.

This invention can be formed by extrusion of aluminum. It can also be made by standard tool and die methods. This concertina wire can be installed by one person, or by an army of firefighters. It can be placed in a forest, on grassland, in a city or anywhere there is a fire to help keep it from spreading. It could be deployed by vehicle or helicopter since it is lightweight.

A smaller version of the present invention can be used to prevent flames and burning-embers from entering the ventilation holes in an attic. A spiral-wound wire inside a mesh screen can be inserted into pre-drilled holes in an attic frieze board or attic soffit. The spiral-wound wire would form a cylinder that would support a surrounding wire-mesh screen. The spiral-wound wire and metal wire mesh would keep out insects, birds and vermin, It would also prevent hot embers of a wildfire from entering an attic, absorb the heat, and dissipate the heat into the air-gaps of the spiral and the mesh screen.

In conclusion, insofar as I am aware, concertina wire has been used to keep people in or out of a place. It was never made from lightweight, heat-absorbing aluminum. It was never made without barbs or razors, and it was never developed or deployed for fighting the spread of wildfires, protecting homes and vehicles, protecting the lives of firefighters or for protecting people from lightning. It is preferred that the invention be installed horizontally but can be installed at an angle or vertically.

SUMMARY

An improved concertina wire that is portable and lightweight, easy to handle, and protects against wildfires by absorbing and dissipating heat. Made of aluminum, the present invention is much lighter than previous concertina wire made of steel. Made without razors, the present invention can be extruded, drawn, or stamped using standard tool and die methods. Made with lightweight, non-rusting aluminum, and without razors, the present invention can be quickly deployed by most everyone without a machine. As coiled concertina wire, or mesh screen, the present invention provides a means of crawling into the center of the coils so that wildfires will be harmlessly absorbed by the wire and dissipated into the air gaps between the wires. The concertina wire and mesh screen can form a Faraday Cage around a person to prevent lightning injuries. Installed in a building, the wire and mesh screen can prevent burning embers from entering an attic through ventilation holes.

Accordingly, several advantages are to provide an improved concertina wire to help prevent the spread of wildfire, save lives of firefighters, save people from lightning, and save houses and vehicles. Still further advantages will become apparent from a study of the following description and the accompanying drawings.

DRAWINGS—FIGURES

DETAILED DESCRIPTION

Figure 1A:
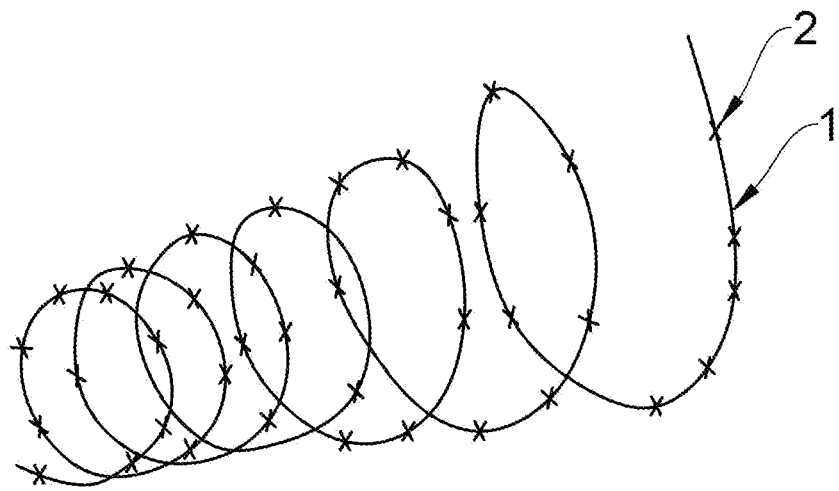
FIG. 1A (PRIOR ART) shows standard steel concertina wire with razors.

FIG. 1A is a PRIOR ART perspective drawing of common concertina wire 1 or razor wire showing the spiral shape of the wire and the razors 2 along the wire. Concertina wire 1 is a type of fencing wire constructed with sharp edges or points arranged at intervals along the strand(s). It is used to construct inexpensive fences and is used in surrounding secured property. It is simple to construct and quick to erect, even by an unskilled person.

Figure 1B:
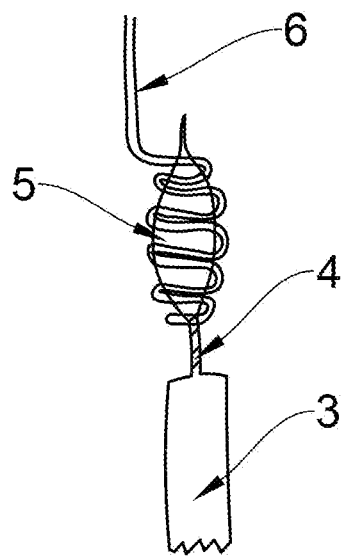
FIG. 1B (PRIOR ART) shows a wire spiral drawing heat and extinguishing a candle.

FIG. 1B is a PRIOR ART front view showing a simple experiment. A candle 3 is lit on its wick 4. A vertical spiral-coil of bare wire 6 is lowered over the candle flame 5. Aluminum is a particularly good heat conductor. In other words, it can quickly equalize temperature differences. If we lower the spiral 6 made from aluminum onto a candle flame 5, which usually burns at 700° C. to 800° C., the spiral 6 begins dissipating heat from the flame 5 into its volume. The flame therefore loses a part of its internal energy and decreases in temperature. This decrease in temperature causes the flame to extinguish.

Similarly, heat applied to the outside of a spiral wire will dissipate the heat into the wire and air gaps of the spiral cylinder so the other side of the cylinder will be much cooler. A horizontal spiral of concertina wire will lower the temperature of a flame on the outside of the spiral through the wire and air gaps, and the huge air gap in the center will dissipate the heat quickly, thereby preventing the flame and the heat from reaching the other side of the concertina wire.

Figure 2:
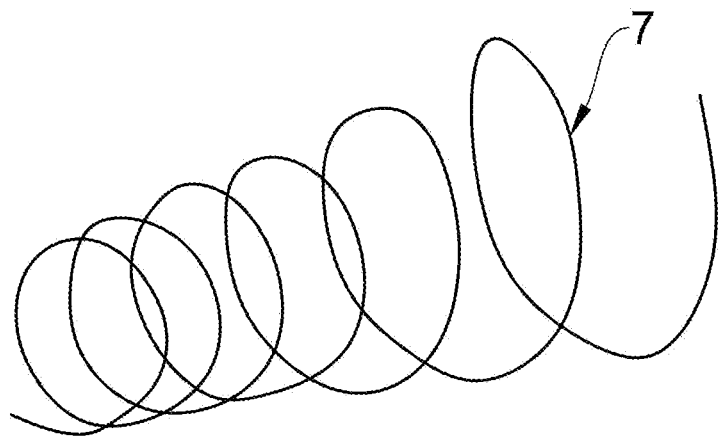
FIG. 2 is a perspective view of concert wire.

FIG. 2 is a perspective view of the present invention, a concert wire 7 made of aluminum and lacking razors. it would not be likely that someone skilled in the art would make concertina wire from relatively soft aluminum, nor would they make the wire without razors or barbs. Lightweight aluminum concertina wire can be lifted and would not stop an intruder. Likewise, without razors or barbs, one skilled in the art would never think of using aluminum wire without razors for protection. The concert wire 7 is made from aluminum which is many times better at absorbing heat than steel, and much lighter. Using concertina wire 1 for firefighting is beyond the realm of one skilled in the art of making concertina wire against intruders.

Figure 3:
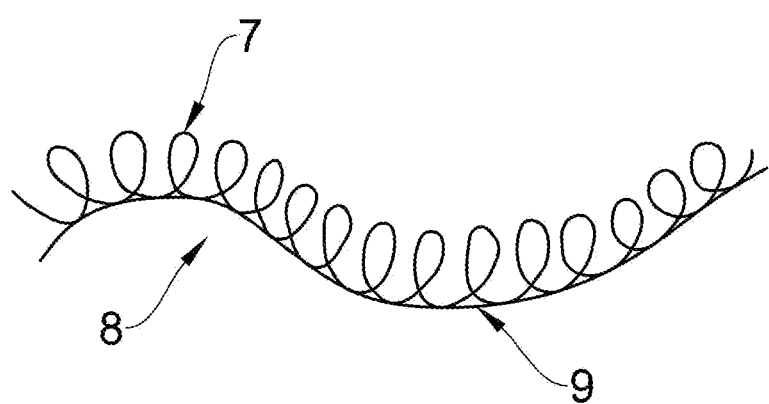
FIG. 3 is a front view of concert wire following the contour of a hill and valley.

FIG. 3 is a front view of concert wire 7 following the contour of a hill 8 and valley 9. Coils of concert wire 7 can be stretched together to form a long barrier against wildfire. it can go up and down a contour and staked to the ground or trees. Firemen can stretch out concert wire near a barn while they fight a fire near a house. Firemen can now fight a fire from several places at once. A small fire can be encircled to prevent spreading, even if the wind changes direction.

Figure 4:
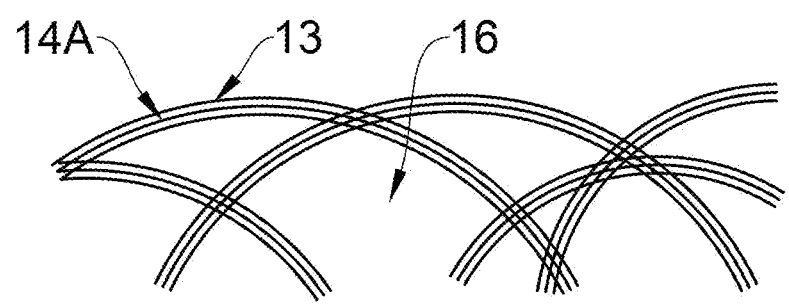
FIG. 4 is a perspective view of concerto wire showing air gaps between wires.
Figure 4A:
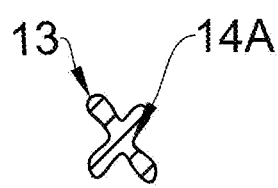
FIG. 4A is a cross-section of concerto wire with an X-shape.

FIG. 4A shows concerto wire 13 extruded with an X-shape 14A in cross-section. This cross-section of the wire provides more surface area along the wire than plain round wire. Heat can be more easily absorbed and dissipated with more surface area and air flow around the wire.

Figure 4B:
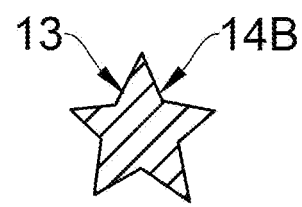
FIG. 4B is a cross-section of concerto wire with a star-shape.

FIG. 4B shows concerto wire 13 that can be extruded with a star-shape 14B in cross-section or any shape polygon with the same benefits as the X-shape 14A.

FIG. 4 is a front view of concerto wire 13 with wire gaps 16 formed by the cylindrical concerto wire 13. The wire gap 16 between the wire strands would allow moving air to dissipate the heat absorbed from the wire.

Computer heat sinks have fins in one direction. A fan in the computer blows air in one direction, usually parallel to the fins. But in a wildfire, winds can blow from all directions such as backdraft and updraft. The increased surface area along the concerto wire's 13 length increases the concerto wire's 13 heat absorption and its dissipation into the wind.

Figure 5:
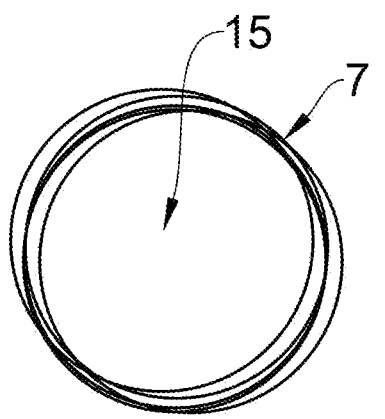
FIG. 5 is an end view of concert wire showing large air-gap in cylinder center.

FIG. 5 is an end view of concert wire 7 showing the large spiral gap 15 in the cylinder that provides air currents to dissipate heat from the concert wire 7.

Figure 6:
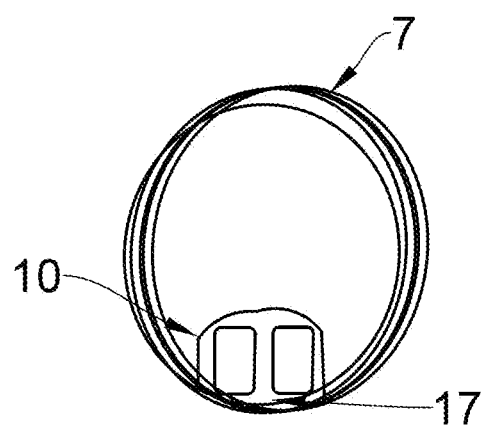
FIG. 6 is an end view of concert wire shown protecting a prone firefighter.

FIG. 6 is an end view of concert wire 7 where a firefighter 10 has crawled in for protection from a fire. We can see his feet here and his head would be at the other end. A heat-reflecting foil 17 would protect the firefighter from the heat of the concert wire 7, as there would not be any air movement under the firefighter. The concert wire 7 could also be used as a causeway so someone could crawl through the cylinder of the concert wire 7 to safety.

Figure 7:
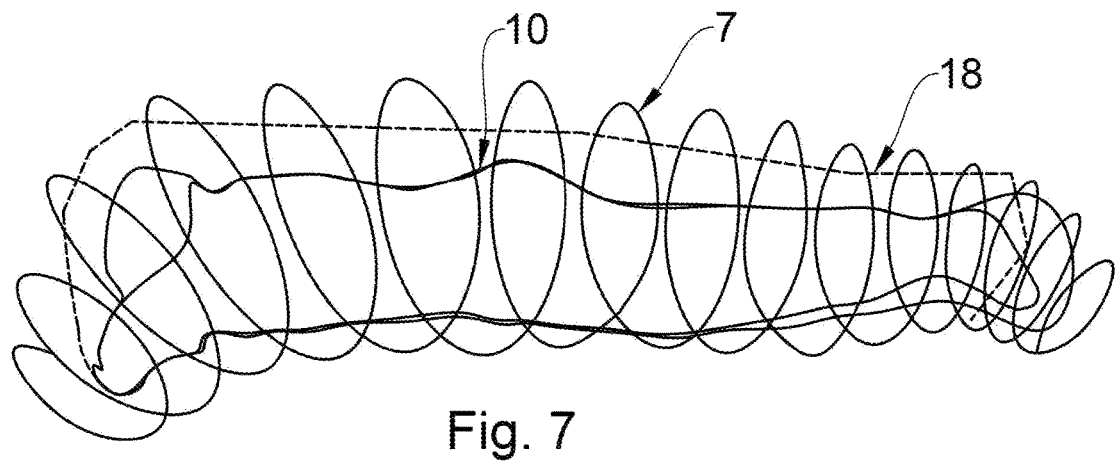
FIG. 7 is a front view of concert wire shown protecting a person from lightning.

FIG. 7 is a side view of the firefighter 10 lying prone in the center of the concert wire 7. both ends of the concert wire 7 can be pulled down to form a dome-shape of concert wire 7 around the firefighter 10 for absorbing and disseminating heat from a wildfire.

Concert wire 7 can also be carried by golfers or hikers as protection against lightning strikes. The concert wire 7 would form a Faraday Cage around a person, as a lightning charge does not transport through the interior of a hollow vessel. Everyone has heard of the phenomena of a hiker's hair rising when a lightning strike is imminent. The sharp points of hair make excellent conductors which enhance the chances of a lightning strike terminating there. The smooth, rounded concert wire 7 around the person reduces the chance of creating conductors by offering a smooth domed metallic surface to the storm cloud. The enclosing cylindrical dome conducts current around the outside of the enclosed space and none passes through the interior.

Figure 8:
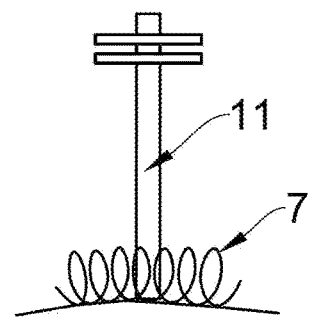
FIG. 8 is a front view showing concert wire protecting a telephone pole.

FIG. 8 is a front view of a concert wire 7 protecting a telephone pole 11. Concert wire 7 can be positioned to keep fire away and prevent transformers from exploding. Keeping electricity supplied to homes during a wildfire is important, especially for underground water pumps. A wildfire in California was started by an exploding transformer on a power pole. Concert wire 7 can be placed around power poles with transformers to help prevent the spread of fire from a power pole.

Figure 9:
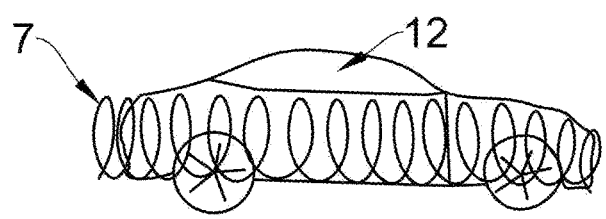
FIG. 9 is a front view showing concert wire protecting a vehicle.

FIG. 9 is a front view showing a concert wire protecting a vehicle 12 from wildfire. Several concert wires 7 can be strung together to protect vehicles, propane tanks, houses, and other buildings and property. They can be permanently placed around important objects.

Figure 10:
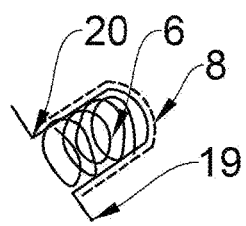
FIG. 10 is a perspective view of a ventilation fire suppressor.

FIG. 10 is a perspective view of a ventilator fire suppressor 20. A spiral-wound wire 6 forms a cylinder. A mesh screen 18 surrounds the spiral-wound wire 6 forming a closed cylinder. A flange 19 is attached to one end of the cylinder. Air can flow completely through the mesh cylinder which is held in a cylinder shape by the spiral-wound wire.

Figure 11:
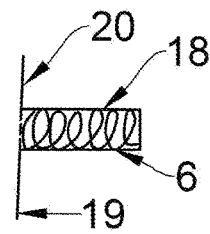
FIG. 11 is a side view of a ventilation fire suppressor when mounted horizontally.

FIG. 11 is a side view of a ventilator fire suppressor 20 with spiral-wound wire 6 and mesh covering 18 as it would be permanently installed on a vertical frieze board 23. The ventilator fire suppressor 20 is installed from the outside of the house into existing or pre-drilled holes on the frieze board 23. The flange 19 keeps the mesh 18 and inner spiral-wound wire 6 flush to the frieze board 23 and prevents it from falling into the attic.

Figure 12:
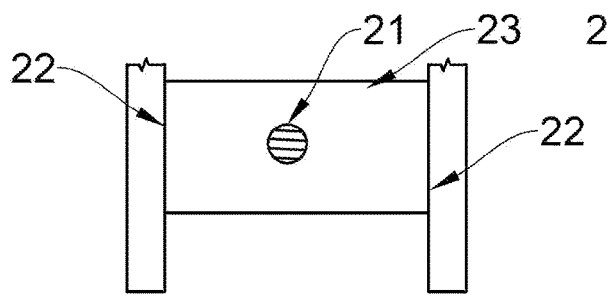
FIG. 12 is a front view of a frieze board with a PRIOR ART ventilator installed.

FIG. 12 is a front view of a PRIOR ART round vent 21 installed in a frieze board 23 between rafters 22. The round vent 21 has louvers that prevents birds and rodents from entering the attic, and lets air in. It does not prevent flames or embers from entering the attic.

Figure 13:
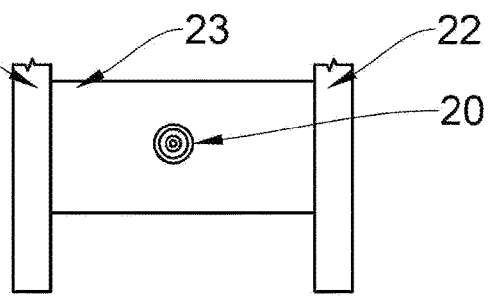
FIG. 13 is a front view of a frieze board with a ventilation fire suppressor installed.

FIG. 13 shows a front view of ventilator fire suppressor 20 installed in a frieze board 23 situated between two rafters on a house. The PRIOR ART round vent 21 can be removed and the ventilator fire suppressor 20 installed in its place, or a new hole can be drilled if there was no previous ventilation in the attic. FIG. 11 shows what the ventilator fir suppressor 20 would look like from the Attic. Most attics are almost always ventilated. Air is brought in through passageways in the frieze board and expelled through the gable end or roof vent Any flames or burning-embers would be cooled below the flash point if they entered through the ventilator fire suppressor 20. The PRIOR ART round vent 21 could not do this.

Figure 14:
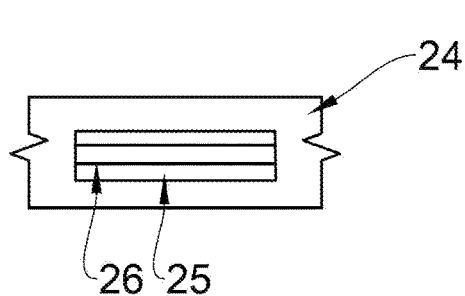
FIG. 14 is an underside view of a soffit with a PRIOR ART ventilator installed.

FIG. 14 shows an underside view of a PRIOR ART rectangular vent 25 with horizontal louvers 26 mounted on a horizontal soffit 24. Air moves up through the soffit on the underside of the roof rafters. The horizontal louvers 26 provide no fire suppression whatsoever, it just keeps birds and vermin out of the attic.

Figure 15:
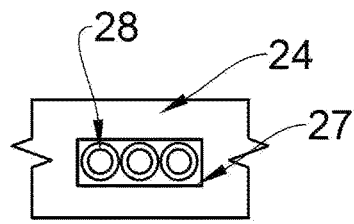
FIG. 15 is an underside view of a soffit with multiple ventilation fire suppressors installed.

FIG. 15 shows multiple ventilator fire suppressors 28 mounted in a rectangular opening 26 that formally held a PRIOR ART rectangular vent horizontal louver 26. One or multiple ventilator fire suppressors 20 can be used in multiple locations to fix holes where burning-embers could enter a home such as a missing brick in a foundation or ventilation hole in a crawlspace.

REFERENCE NUMERALS

1 PRIOR ART Concertina wire
2 Razors
3 Candle
4 Wick
5 Flame
6 Spiral wire
7 Concert wire
8 Hill
9 Valley
10 Firefighter
11 Telephone pole
12 Vehicle
13 Concerto wire
14A X-cross section
14B Star cross-section
15 Spiral cylinder air gap
16 Spiral wire air gap
17 Foil
18 Mesh screen
19 Flange
20 Ventilation fire suppressor
21 PRIOR ART round ventilator
22 Rafter
23 Frieze board
24 Soffit
25 PRIOR ART rectangular ventilator
26 Louvers
27 Rectangular opening
28 Multiple ventilator fire suppressors

CONCLUSIONS, RAMIFICATIONS, SCOPE

Thus the reader will see that at least one embodiment of the spiral wire provides a reliable, lightweight, and economical device that can be used by persons of almost any age to prevent the spread of wildfire, protect people and buildings from wildfire, and protect people from lightning.

While my above description contains many specificities, these should not be construed as limitations on the scope, but rather as an exemplification of one preferred embodiment thereof. Many other variations are possible. For example, the cylinder can be round or oval so it won't roll away, or staked to the ground or an object. The cylinders can be stacked horizontally to prevent fire from spreading to shrubs. They can also be hung vertically along forest roads.

Smaller versions of spiral-wound wire can be covered with mesh screen and permanently installed in soffits and frieze boards on a building to safely vent an attic. The spiral-wound wire provides a cylinder-shape support to the mesh screen. The closed-cylinder shape provides increased surface area to the mesh screen so it can absorb and dissipate heat from burning embers or flames from a forest fire so the contents of the attic won't catch on fire. The cylinder-shape increases the mesh surface area tremendously over a simple flat screen or louvers.

The spiral wire can be formed around a metal blank, drawn, or made by rotary dies. Other techniques of wire forming to change the contour is by bending, swaging, piercing, chamfering shearing or other techniques. Common metals include steel, brass, stainless steel, and different alloys. The diameter of the wire can vary. Other wire forming include roll, bend, fourslide, hydraulic, pneumatic and CNC. The wire can be solid or hollow, narrow or wide, flat or round.

The spiral wire can be painted to match the background. Aluminum wire can be anodized for protection and to match a background. Special coatings can be applied for heat absorption. Heat sinks can be applied to the wire at the factory or in the aftermarket. Fans or wind turbines can be used for added heat dissipation.

Accordingly, the scope should be determined not by the embodiments illustrated, but by the appended claims and their legal equivalents.

I claim:

1. A fire preventing coil comprising:
   a. a continuous, spiral-wound, light-weight metal wire,
   b. said light-weight wire having a substantially smooth surface,
   c. said coil having multiple turns of substantially uniform wire forming the shape of a cylinder,
   d. said wire being free from barbs present in spiral-wound barriers, and has a smooth light-weight aluminum surface as a means for absorbing heat,
   e. said wire having a generally round cross-section as a means for ease of carrying, handling and portability by a person,
   f. said wire is also flexible and stretchable as a means for ease of deployment by a person on flat or hilly terrain,
   g. said cylinder forming variable and adjustable air gaps between said aluminum spirals when said cylinder is stretched apart, as a means of dissipating heat from said aluminum wire,
   h. said cylinder having an inside diameter forming a large air gap in said cylinder, as a means for dissipating heat upward and outward.

2. The fire preventing coil of claim 1, having said adjustable air gap between spirals, and said air gap in said cylinder as a means of absorbing and dissipating heat from one side, therefore lowering the combustion temperature on the opposite side of said cylinder, thereby preventing the spread of wildfires.

3. The fire-preventing coil of claim 1 having sufficient heat-absorbing, light-weight metal and air gaps, as a means of absorbing and dissipating heat from wind-blown flaming embers, thereby preventing heat and wildfires from crossing roads and bare areas.

4. A fire preventing coil comprising a smooth, spiral-wound aluminum wire forming a flexible, stretchable cylinder having air gaps between said spirals and a large air gap inside said cylinder of sufficient diameter that a human can easily and safely crawl into and through.

5. The fire preventing coil of claim 4 having sufficient wire as a means for absorbing heat, and air gaps between said spirals and large air gap inside the diameter of the cylinder as a means for dissipating said heat upward and outward, thereby protecting a person inside said cylinder from burns.

6. The fire preventing coil of claim 5 having sufficient diameter that a human can crawl into, and having said stretchability and flexibility that the ends of said cylinder can close, thereby forming a smooth, domed cylinder as a means for forming a Faraday Cage, thereby protecting a person inside said cylinder against lightning.

7. A spiral-wound wire inside a mesh screen whereas said spiral-wound wire forms a cylinder of metal that supports and shapes said mesh screen into a cylindrical shape around said spiral-wound wire, whereas the spiral-wound wire and mesh screen having a closed end of mesh at both ends of said cylindrical mesh screen and the spiral-wound wire and mesh screen having a generally flat flange at one end of said cylindrical mesh screen, and the spiral-wound wire and mesh screen having sufficient diameter for insertion into a pre-drilled hole in a frieze board on a home, while said flange allows insertion from the outside of a home and attachment to said home, as a means for providing ventilation into the attic of the home, while keeping out birds, insects and vermin.

8. The spiral-wound wire and mesh screen of claim 7 wherein the metal of said wire, screen and cylinder forming a heat sink for the absorption of said heat, and said spiral-wound wire, said mesh and said cylinder forming air gaps for the dissipation of said heat safely into the air around said cylinder, thereby preventing flammable material in the house from catching on fire from heat and flaming embers.

9. The spiral-wound wire, mesh screen, and cylinders of claim 8 having a plurality nested together as a means of filling larger ventilation holes, rectangles, and other odd shapes that provide ventilation into a home, thereby preventing flammable material in the house from catching on fire from heat and flaming embers.

10. The spiral-wound wire and mesh screen of claim 8 forming a barrier to flaming embers from a wildfire, and forming abundant heat sinks and air gaps for the absorption and dissipation of heat so any flaming embers will have their heat dissipated into the air before any flammable material in the attic will catch fire.

\* \* \* \* \*